United States Patent
Xu et al.

(10) Patent No.: US 9,665,203 B2
(45) Date of Patent: May 30, 2017

(54) CAPACITIVE IN-CELL TOUCH PANEL AND DISPLAY DEVICE

(71) Applicants: HEFEI BOE OPTOELECTRONICS TECHNOLOGY CO., LTD., Hefei, Anhui (CN); BOE TECHNOLOGY GROUP CO., LTD., Beijing (CN)

(72) Inventors: Yubo Xu, Beijing (CN); Suzhen Mu, Beijing (CN); Ming Hu, Beijing (CN); Byung Cheon Lim, Beijing (CN)

(73) Assignees: HEFEI BOE OPTOELECTRONICS TECHNOLOGY CO., LTD, Hefei, Anhui (CN); BOE TECHNOLOGY GROUP CO., LTD., Beijing (CN)

( * ) Notice: Subject to any disclaimer, the term of this patent is extended or adjusted under 35 U.S.C. 154(b) by 385 days.

(21) Appl. No.: 14/348,723

(22) PCT Filed: Jun. 19, 2013

(86) PCT No.: PCT/CN2013/077493
§ 371 (c)(1),
(2) Date: Mar. 31, 2014

(87) PCT Pub. No.: WO2014/153862
PCT Pub. Date: Oct. 2, 2014

(65) Prior Publication Data
US 2016/0188071 A1    Jun. 30, 2016

(30) Foreign Application Priority Data
Mar. 25, 2013   (CN) .......................... 2013 1 0097147

(51) Int. Cl.
*G06F 3/041*   (2006.01)
*G06F 3/044*   (2006.01)

(52) U.S. Cl.
CPC ............ *G06F 3/0416* (2013.01); *G06F 3/044* (2013.01); *G06F 3/0412* (2013.01)

(58) Field of Classification Search
CPC ....... G06F 3/0416; G06F 3/0412; G06F 3/044
(Continued)

(56) References Cited

U.S. PATENT DOCUMENTS 8,289,298 B2    10/2012   Choi et al.
9,405,330 B2 *   8/2016   Yamagishi .............. G06F 3/044
(Continued)

FOREIGN PATENT DOCUMENTS

CN    102445780 A    5/2012
CN    102445799 A    5/2012
(Continued)

OTHER PUBLICATIONS

International Preliminary Report on Patentability issued Sep. 29, 2015, PCT/CN2013/077493.
(Continued)

*Primary Examiner* — Dmitriy Bolotin
(74) *Attorney, Agent, or Firm* — Ladas & Parry LLP (57) ABSTRACT

A capacitive in-cell touch panel and a display device is provided, which may realize the touch function without introducing new film layers, and includes an array substrate, a gate line, a data line and a common electrode layer are disposed on the array substrate. The common electrode layer includes a plurality of touch drive electrode elements and a plurality of touch sense electrode elements insulated from each other. The touch drive electrode elements include a plurality of touch drive sub-electrodes; the touch sense electrode elements include a plurality of touch sense sub-electrodes. The touch drive sub-electrodes or the touch sense sub-electrodes are bridged to each other along a data line direction, and the touch sense sub-electrodes or the touch (Continued)

drive sub-electrodes are directly connected with each other along a gate line direction; or, the touch drive sub-electrodes or the touch sense sub-electrodes are bridged to each other along the gate line direction, and the touch sense sub-electrodes or the touch drive sub-electrodes are directly connected along the data line direction.

11 Claims, 4 Drawing Sheets

(58) Field of Classification Search
USPC .................................................. 345/173, 174
See application file for complete search history.

(56) References Cited

U.S. PATENT DOCUMENTS

| | | | |
|---|---|---|---|
| 2010/0097334 A1 | 4/2010 | Choi et al. | |
| 2010/0103121 A1 | 4/2010 | Kim et al. | |
| 2010/0194695 A1 | 8/2010 | Hotelling et al. | |
| 2010/0194697 A1* | 8/2010 | Hotelling | G06F 3/0412 345/173 |
| 2011/0096023 A1* | 4/2011 | Shih | G06F 3/0412 345/174 |
| 2011/0242444 A1* | 10/2011 | Song | G06F 3/0412 349/43 |
| 2012/0086654 A1* | 4/2012 | Song | G06F 3/0412 345/173 |
| 2012/0086879 A1 | 4/2012 | Yu et al. | |
| 2013/0033439 A1* | 2/2013 | Kim | G02F 1/13338 345/173 |
| 2013/0314625 A1* | 11/2013 | Tsai | G06F 3/044 349/12 |
| 2013/0335366 A1* | 12/2013 | Lee | G06F 3/044 345/174 |
| 2014/0048854 A1 | 2/2014 | Wang et al. | |
| 2014/0055685 A1 | 2/2014 | Wang et al. | |
| 2014/0062944 A1* | 3/2014 | Wang | G06F 3/0412 345/174 |
| 2014/0092326 A1* | 4/2014 | Zhou | G06F 3/0412 349/12 |
| 2014/0145996 A1* | 5/2014 | Sugita | G06F 3/044 345/173 |
| 2014/0168161 A1* | 6/2014 | Sugita | G06F 3/044 345/174 |
| 2014/0210774 A1* | 7/2014 | Kim | G06F 3/044 345/174 |
| 2014/0333582 A1* | 11/2014 | Huo | G02F 1/13338 345/174 |
| 2015/0002421 A1* | 1/2015 | Kim | G06F 3/041 345/173 |
| 2015/0029118 A1* | 1/2015 | Xu | G06F 3/044 345/173 |
| 2015/0253899 A1* | 9/2015 | Yang | G06F 3/044 345/174 |

FOREIGN PATENT DOCUMENTS

| | | |
|---|---|---|
| CN | 102768604 A | 11/2012 |
| CN | 102830879 A | 12/2012 |
| CN | 102841716 A | 12/2012 |
| CN | 102841718 A | 12/2012 |
| CN | 202711227 A | 1/2013 |
| CN | 102937845 A | 2/2013 |
| CN | 203217536 U | 9/2013 |
| JP | 2007-033789 A | 2/2007 |
| JP | 2009-271308 A | 11/2009 |
| JP | 2010-015505 A | 1/2010 |
| JP | 2010-186182 A | 8/2010 |
| JP | 2011-527787 A | 11/2011 |
| KR | 20100046891 A | 5/2010 |
| KR | 20120100488 A | 9/2012 |

OTHER PUBLICATIONS

Second Chinese Office Action dated Nov. 23, 2015; Appln. No. 201310097147.2.
International Search Report Appln. No. PCT/CN2013/077493; Dated Dec. 26, 2013.
First Chinese Office Action Appln. No. 201310097147.2; Dated Jun. 23, 2015.
Korean Examination Opinion Appln. No. 10-2014-7010718; Dated Aug. 5, 2015.
Korean Office Action dated Feb. 27, 2016; Appln. No. 10-2014-7010718.
Extended European Search Report dated Oct. 27, 2016; Appln. No. 13840131.0-1972-2980684 PCT/CN2013077493.
Japanese Office Action dated Mar. 17, 2017; Appln. No. 2016-503515.

\* cited by examiner

CAPACITIVE IN-CELL TOUCH PANEL AND DISPLAY DEVICE

FIELD OF THE ART

The embodiments of the invention relate to a capacitive in-cell touch panel and a display device.

BACKGROUND

A touch panel is an input device that allows a user, by using a finger directly or by way of an object, to input user instructions by selecting instruction contents displayed on a screen such as an image display. When the touch panel is touched by the user finger directly or by the object, the touch panel detects a touch point and drives a Liquid Crystal Display according to a command indicated by a selected icon so as to display contents.

Conventional touch panels are generally classified into add on touch panels and in-cell touch panels, based on the disposition of the touch panels in the liquid crystal display. Among the two different types of touch panels, an in-cell touch panel is disposed inside a panel of the liquid crystal display, thereby significantly reducing the thickness of the liquid crystal display products. Currently, there are many design solutions for the in-cell touch panel display devices. Generally the touch function is realized by adding one or two layers of transparent electrode in the liquid crystal cell. However, such configured in-cell touch panels suffer from complicated processes; moreover, the transmittance of the liquid crystal display is influenced.

SUMMARY

Embodiments of the invention provide a capacitive in-cell touch panel and a display device, which may realize the touch function without introducing new film layers.

An embodiment of the invention provides a capacitive in-cell touch panel, the touch panel comprises an array substrate on which a gate line, a data line and a common electrode layer are disposed. Herein, the common electrode layer comprises a plurality of touch drive electrode elements and a plurality of touch sense electrode elements insulated from each other. The touch drive electrode elements comprise a plurality of touch drive sub-electrodes; the touch sense electrode elements comprise a plurality of touch sense sub-electrodes. The touch drive sub-electrodes or the touch sense sub-electrodes are bridged to each other along a data line direction, the touch sense sub-electrode or the touch drive sub-electrodes are directly connected with each other along a gate line direction; or, the touch drive sub-electrodes or the touch sense sub-electrodes are bridged to each other along the gate line direction and the touch sense sub-electrode or the touch drive sub-electrodes are directly connected with each other along the data line direction.

As an example, at least one gate line functions as a touch scan line during a touch period for applying a touch scan signal to the touch drive electrode elements, when the touch drive sub-electrodes are directly connected with each other along the gate line direction and the touch sense sub-electrodes are bridged to each other along the data line direction.

As an example, the touch panel further comprises a signal connection line, when the touch drive sub-electrodes are directly connected with each other along the gate line direction and the touch sense sub-electrodes are bridged to each other along the data line direction, adjacent touch sense sub-electrodes along the data line direction are bridged to each other via the signal connection line, and the signal connection line is disposed in the same direction as the data line.

As an example, the touch panel further comprises a signal connection line, when the touch drive sub-electrodes are bridged to each other along the data line direction and the touch sense sub-electrodes are directly connected with each other along the gate line direction, adjacent touch drive sub-electrodes along the data line direction are bridged to each other via the signal connection line, and the signal connection line is disposed in the same direction as the data line.

As an example, the signal connection line and the data line are disposed on the same layer.

As an example, the touch panel further comprises a signal connection line, when the touch drive sub-electrodes are directly connected with each other along the data line direction and the touch sense sub-electrodes are bridged to each other along the gate line direction, adjacent touch sense sub-electrodes along the row direction are bridged to each other via the signal connection line, and the signal connection line is disposed in the same direction as the gate line.

As an example, the touch panel further comprises a signal connection line, when the touch drive sub-electrodes are bridged to each other along the gate line direction and the touch sense sub-electrodes are directly connected with each other along the data line direction, adjacent touch drive sub-electrodes along the gate line direction are bridged to each other via the signal connection line, and the signal connection line is disposed in the same direction as the gate line.

As an example, the signal connection line and the gate line are disposed in the same layer.

An embodiment of the invention provides a display device comprising the above touch panel.

As an example, the signal connection line is disposed in a region corresponding to blue pixels when the signal connection line and the data line in the touch panel are disposed in the same direction.

Embodiments of the invention provide a touch panel and a display device. The touch panel comprises an array substrate; a gate line, a data line and a common electrode layer are disposed on the array substrate. Herein, the common electrode layer comprises a plurality of touch drive electrode elements and a plurality of touch sense electrode elements insulated from each other. The touch drive electrode elements comprise a plurality of touch drive sub-electrodes; the touch sense electrode elements comprise a plurality of touch sense sub-electrodes. The touch drive sub-electrodes or the touch sense sub-electrodes are bridged to each other along a data line direction, the touch sense sub-electrodes or the touch drive sub-electrodes are directly connected with each other along a gate line direction; or, the touch drive sub-electrodes and the touch sense sub-electrodes are bridged to each other along the gate line direction and the touch sense sub-electrodes or the touch drive sub-electrodes are directly connected with each other along the data line direction. The touch panel display device realizes the touch function without introducing new film layers by designing a splitting solution for common electrodes. That is, the touch drive electrode elements and the touch sense electrode elements of the touch panel are respectively formed by bridging and direct connection, or the touch sense electrode elements and the touch drive electrode elements of the touch panel are respectively formed by bridging and direct connection. It thus simplifies the fabrication process of the in-cell touch panels.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

DETAILED DESCRIPTION

In order to make objects, technical details and advantages of the embodiments of the invention apparent, the technical solutions of the embodiment will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

Unless otherwise defined, all the technical and scientific terms used herein have the same meanings as commonly understood by one of ordinary skill in the art to which the present invention belongs. The terms "first," "second," etc., which are used in the description and the claims of the present application for invention, are not intended to indicate any sequence, amount or importance, but distinguish various components. Also, the terms such as "a," "an," etc., are not intended to limit the amount, but indicate the existence of at lease one. The terms "comprises," "comprising," "includes," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

An embodiment of the invention provides a capacitive in-cell touch panel and a display panel which may realize the touch control function without introducing new film layers.

Figure 1:
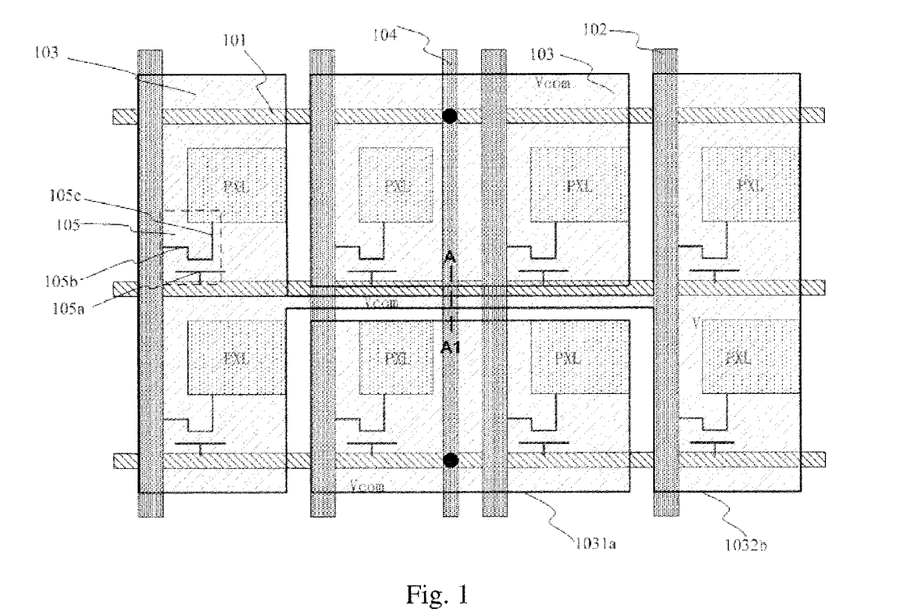
FIG. 1 is a plan top view of an array substrate provided by a first embodiment of the invention.

A first embodiment of the invention provides a capacitive in-cell touch panel. The touch panel comprises an array substrate as illustrated in FIG. 1. As shown in FIG. 1, a gate line 101, a data line 102 and a common electrode layer 103 are disposed on the substrate. The common electrode layer 103 comprises a plurality of touch drive electrode elements 1031 and a plurality of touch sense electrode elements 1032 insulated from each other (refer to FIG. 3). A touch drive electrode element 1031 comprises a plurality of touch drive sub-electrodes 1031a, a touch sense electrode elements 1032 comprises a plurality of touch sense sub-electrodes 1032b. Herein, the touch drive sub-electrodes 1031a are bridged along a data line 102 direction and the touch sense sub-electrodes 1032b are directly connected with each other along a gate line 101 direction.

As illustrated in FIG. 1, the touch panel further comprises a signal connection line 104. When the touch drive sub-electrodes 1031a are bridged along the data line 102 direction and the touch sense sub-electrodes 1032b are directly connected with each other along the gate line 101 direction, a touch drive sub-electrodes is bridged to an adjacent touch drive sub-electrode along the data line 102 direction via the signal connection line 104, and the signal connection line 104 is disposed in the same direction as the data line 102.

Figure 2:
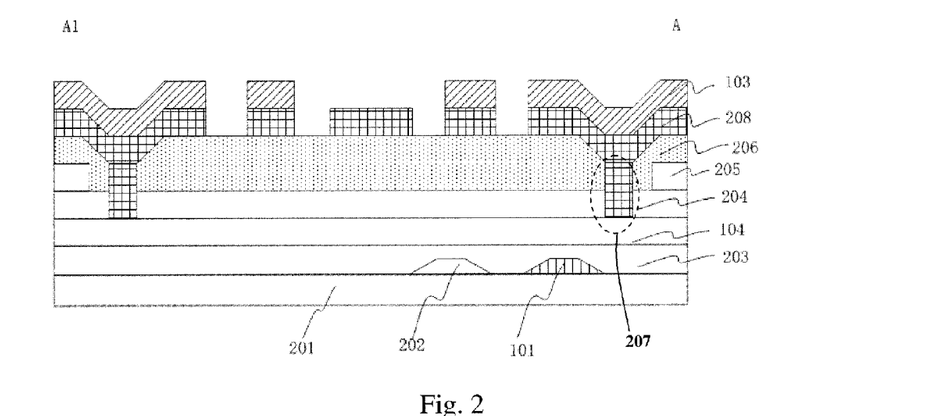
FIG. 2 is a cross section view taken along A1-A of FIG. 1.

FIG. 2 is a cross section view taken along the broken line A1-A of FIG. 1. It is seen from FIG. 2 that the array substrate further comprises a substrate 201, a metal line 202, a gate insulation layer 203, an insulation layer 204, a pixel electrode 205, a passivation layer 206, a via hole 207 and a metal layer 208. The substrate 201 is a glass substrate. The gate line 101 is disposed over the substrate 201. The metal line 202 is disposed in the same layer as the gate line 101 and parallel to the gate line 101. The metal line 102 is connected to the common electrode layer 103 through the via hole 207 to reduce a resistance of the common electrode layer 103.

The gate insulation layer 203 is disposed over the gate line 101 and the metal line 202, for insulating the gate electrode and other electrode layers.

The signal connection line 104 is disposed in the same layer as the data line 102 and made of a metal material such as copper and iron.

The insulation layer 204 is disposed between the signal connection line 104 and the pixel electrode 205 and configured for insulating the pixel electrode 205 and the signal connection line 104.

The pixel electrode 205 is disposed over the insulation layer 204 and made of a transparent conductive material such as indium tin oxides (ITO).

The passivation layer 206 is disposed between the pixel electrode 205 and the metal layer 208 and configured for insulating the pixel electrode 205 and the metal layer 208.

The signal connection line 104 is connected with the metal layer 208 through the via hole 207.

The metal layer 208 is disposed between the passivation layer 206 and the common electrode layer 103 and directly connected to the common electrode layer 103, so as to reduce the resistance of the common electrode layer 103.

The common electrode layer 103 is disposed over the metal layer 208 and comprises the touch drive electrode element 1031 and the touch sense electrode element 1032. Herein, the plurality of touch drive sub-electrodes 1031a forming the touch drive electrode element 1031 are connected with each other via the signal connection line 104.

When a user touches the touch panel with a finger or a stylus, the user's finger or the stylus couples with the common electrode layer 103 at the touch point and a coupling capacitance is generated, thereby affecting the output voltage and the output current at the touch point. If the output voltage and/or output current at the touch point changes, it shows that there is a touch action.

Furthermore, it also needs to determine the specific location of the touch point in the touch panel after determining whether the touch panel is touched.

As illustrated in FIG. 1, the array substrate provided by the first embodiment of the invention further comprises Thin Film Transistor (TFT) 105 having a gate 105a, a source 105b and a drain 105c. The gate 105a is electrically connected to the gate line 101, the source 105b is connected to the data line 102, the drain 105c is electrically connected to the pixel electrode 205 through a via hole. The TFT 105 is configured for controlling a voltage across the pixel electrode 205 and a voltage across the common electrode 103. An electric field between the pixel electrode 205 and the common electrode 103 is varied by changing the voltage across the pixel electrode 205 and the voltage across the common electrode 103, thereby changing the brightness of the liquid crystal display so as to realize display with different grayscales.

In the touch panel provided by the embodiment of the invention, the common electrode layer is improved such that the plurality of touch drive sub-electrodes can be connected together to form the touch drive electrode element of the touch panel. Furthermore, the plurality of touch sense sub-electrodes can be connected together to form the touch sense electrode element of the touch panel. The touch drive electrode element and the touch sense electrode element are arranged vertical across with each other. It may determine the specific location of the touch point in the touch panel according to the row or column having a varied voltage output by the touch drive electrode element and the touch sense electrode element.

The common electrode layer is formed on the metal layer 208. Next, a patterning process is used to divide the common electrode layer into touch drive electrode elements 1031 and the touch sense electrode elements 1032 arranged vertical across with each other as illustrated in FIG. 3.

Figure 3:
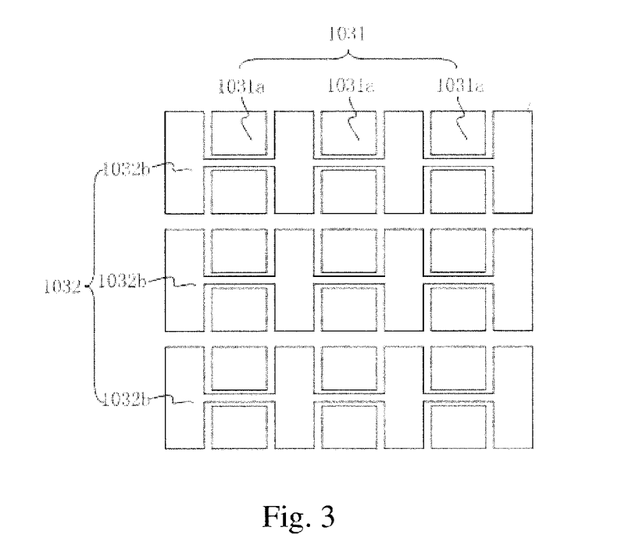
FIG. 3 schematically illustrates a plan diagram of a common electrode layer provided by the first embodiment of the invention.

As illustrated in FIG. 3, the touch sense electrode elements 1032 are arranged laterally, and each lateral array is electrically isolated from an adjacent lateral array. Each lateral array comprises a plurality of touch sense sub-electrodes 10326 and the plurality of touch sense sub-electrodes 1032b in each lateral direction are sequentially electrically connected with each other. Each touch sense sub-electrode 1032b is formed by the electrically connected common electrodes of multiple pixels.

The touch drive electrode elements 1031 are arranged longitudinally, and each longitudinal array is electrically isolated from an adjacent longitudinal array. Each longitudinal array comprises a plurality of touch drive sub-electrodes 1031a and the plurality of touch drive sub-electrodes 1031a in each longitudinal direction are sequentially electrically connected with each other. Each touch drive sub-electrode 1031a is formed by the electrically connected common electrodes of multiple pixels.

When seen wholly from the point of view of the liquid crystal display, the common electrode layer 103 is continuous in the whole surface. Therefore, as illustrated in FIG. 3, when etching and forming the touch drive electrode elements 1031 and the touch sense electrode elements 1032 in the common electrode layer 103 continuous in the whole surface, the multiple touch drive sub-electrodes 1031a in each longitudinal direction in the touch drive electrode elements 1031 would be discontinued if it ensures that the multiple touch sense sub-electrodes 1032b in each lateral direction in the touch sense electrode elements 1032 are continuous. An additional signal connection line 104 has to be disposed such that the multiple touch drive sub-electrodes 1031a in each vertical direction are electrically connected with each other, in order to realize the electrical connection among the multiple touch drive sub-electrodes 1031a of each vertical direction.

The signal connection line 104 has to be disposed in a layer different from the common electrode layer, otherwise the touch sense sub-electrodes 1032b connected along the gate line direction will be short-circuited to the touch drive sub-electrodes 1031a connected along the data line direction. That is, a short circuit will occur between the touch sense electrode elements 1032 and the touch drive electrode elements 1031.

Figure 4:
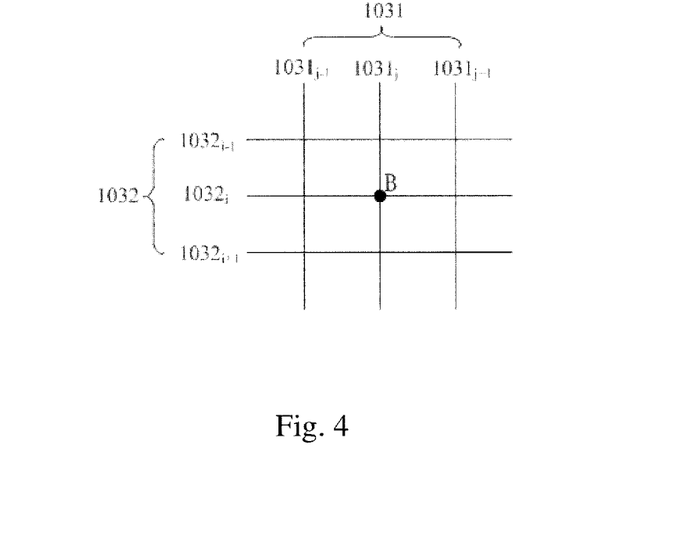
FIG. 4 is an equivalent circuit diagram of a common electrode provided by the first embodiment of the invention.

FIG. 4 is an equivalent circuit diagram of the common electrode layer in FIG. 1. Each lateral line in FIG. 4 represents a lateral array and each longitudinal line represents a longitudinal array. $1032_{i-1}$, $1032_i$ and $1032_{i+1}$ represent three adjacent lateral arrays, that is, arrays of touch sense electrode element, where i=1, 2, 3, 4 . . . ; $1031_{j-1}$, $1031_j$ and $1031_{j+1}$ represent three adjacent longitudinal arrays, that is, arrays of touch sense electrode element, where j=1, 2, 3, 4 . . . . Individual lateral arrays respectively intersect individual longitudinal arrays to form a plurality of points of intersection. For example, the point of intersection between the lateral array $1032_i$ and the longitudinal array $1031_j$ is $B(x_i, y_j)$.

A detection unit is also disposed in the liquid crystal display. The detection unit provides a reference voltage for output terminals of individual pixel elements. The detection unit sequentially scans the lateral arrays and longitudinal arrays and compares the detected real voltage value of individual lateral and longitudinal arrays with the reference voltage to determine if there is a touch.

In the following, an example of determining whether a point B is touched and how to determine the coordinates (x, y) of the point B will be described.

When the detection unit finishes scanning and detecting the lateral array $1032_{i-1}$, the lateral array $1032_i$ will be scanned next. The actual voltage output by individual points in the lateral array $1032_i$ will be detected and the detected actual voltage will be compared with the reference voltage provided by the detection unit. If the detected actual voltage is the same as the reference voltage, it shows that there is no touch point in the lateral array $1032_i$. If the detected actual voltage is different from the reference voltage, it shows that there is a touch point in the lateral array $1032_i$, and the y-axis of the touch point can thus be determined. At this time, the scan unit is sequentially scanning every longitudinal array. When it finishes scanning and detecting the longitudinal array $1031_{j-1}$, the scan unit will continue to scan the longitudinal array $1031_j$, to detect actual voltage output by individual points in the longitudinal array $1031_j$, and to compare the detected actual voltage with the reference voltage provided by the detection unit. If the detected actual voltage is the same as the reference voltage, it shows that there is no touch point in the longitudinal array $1031_j$. If the detected actual voltage is different from the reference voltage, it shows that there is a touched point in the longitudinal array $1031_j$, and the x-axis of the touched point can thus be determined. Considering the lateral arrays and the longitudinal arrays at the same time, if there is a touch point in the lateral array $1032_i$ and there is a touch point in the longitudinal array $1031_j$, then the coordinates (x, y) of the touch point B can be determined according to the y-axis of the lateral array $1032_i$ and the x-axis of the longitudinal array $1031_j$.

Figure 5:
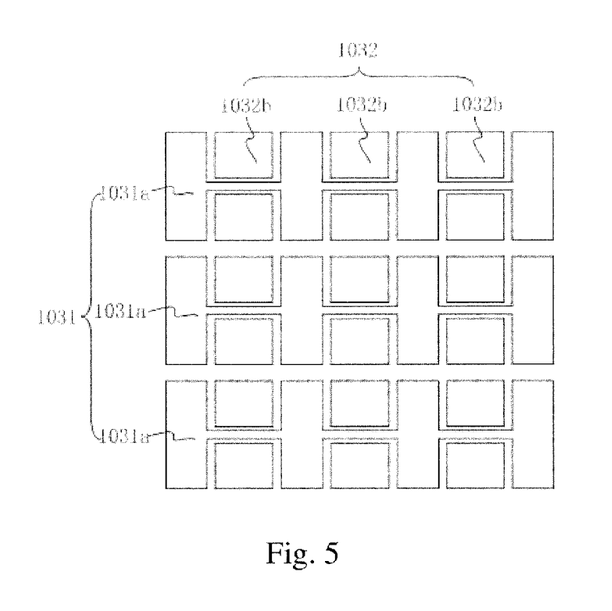
FIG. 5 is a plan top view of an array substrate provided by a second embodiment of the invention.

A second embodiment of the invention provides another array substrate with a plan top view as shown in FIG. 5. The array substrate shown in FIG. 5 differs from that of FIG. 1 in that the touch drive sub-electrodes 1031a are directly connected with each other along the gate line 101 direction and the touch sense sub-electrodes 1032b are bridged to each other along the data line 102 direction. The touch sense sub-electrodes 1032b are bridged to adjacent touch sense sub-electrodes along the data line direction via the signal connection line, wherein the signal connection line is disposed in the same direction as the data line. The principle of operation of the array substrate shown in FIG. 5 is the same as the array substrate of FIG. 1.

Figure 6:
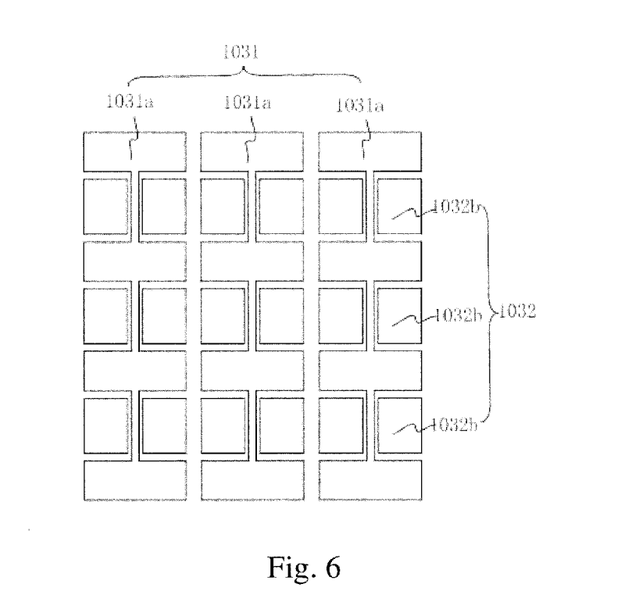
FIG. 6 is a plan top view of an array substrate provided by a third embodiment of the invention.

A third embodiment of the invention provides an array substrate with a plan top view as shown in FIG. 6. The array substrate shown in FIG. 6 differs from that of FIG. 1 in that the touch drive sub-electrodes 1031a are directly connected with each other along the data line 102 direction and the touch sense sub-electrodes 1032b are bridged to each other along the gate line 101 direction. The touch sense sub-electrodes 1032b are bridged to adjacent touch sense sub-electrodes along the row direction via the signal connection line 104, wherein the signal connection line 104 is disposed in the same direction as the gate line 101. The principle of operation of the array substrate shown in FIG. 6 is the same as the array substrate of FIG. 1.

Figure 7:
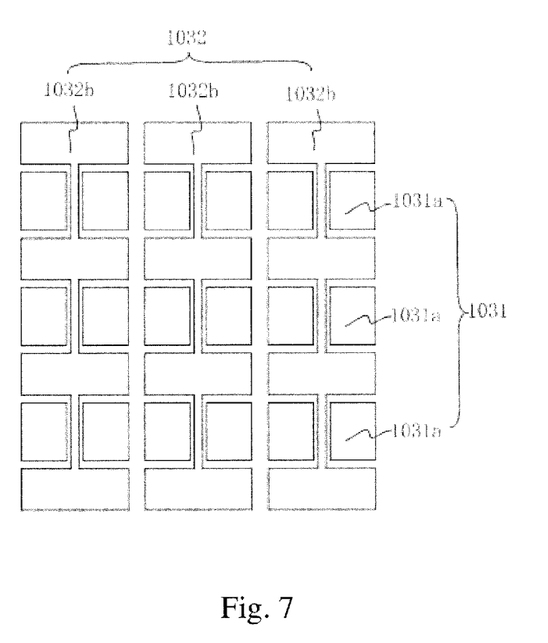
FIG. 7 is a plan top view of an array substrate provided by a fourth embodiment of the invention.

A fourth embodiment of the invention provides an array substrate with a plan top view as shown in FIG. 7. The array substrate shown in FIG. 7 differs from that of FIG. 1 in that the touch drive sub-electrodes 1031a are bridged to each other along the gate line direction and the touch sense sub-electrodes 1032b are directly connected with each other along the data line 102 direction. The touch drive sub-electrodes 1031a are bridged to adjacent touch drive sub-electrodes in the gate line direction via the signal connection line, and the signal connection line is disposed in the same direction as the gate line 101. The principle of operation of the array substrate shown in FIG. 7 is the same as the array substrate of FIG. 1.

Another embodiment of the invention further provides a display device comprising the above touch panel.

The signal connection line 104 in the touch panel is disposed in a region corresponding to a blue pixel when the signal connection line 104 and the data line 102 in the touch panel are disposed in the same direction. People's eyes have different sensitivity towards different colors and are not as sensitive to the blue color. Therefore, the picture quality will not be compromised even if the blue pixels are reduced by a certain degree.

In summary, with the capacitive in-cell touch panel and the display device provided by the embodiment of the invention, it does not need to dispose additional sense electrode and sense electrode. Instead, the common electrode layer is improved such that an electric field for driving the liquid crystal molecules to move may be formed between the improved common electrode and the pixel electrode. Meanwhile, the common electrode may form a coupling capacitor with the user at the touched point, such that it can determined whether the touch panel is touched. Moreover, the common electrode layer has an array of touch sense electrode elements and an array of touch drive electrode elements arranged as intersecting each other, the array of touch sense electrode elements are disposed laterally and the array of touch drive electrode elements disposed longitudinally. Therefore, it may sequentially scan the array of individual touch sense electrode elements in the lateral direction and sequentially scan the array of individual touch drive electrode elements in the longitudinal direction and then determine the specific location of the touched point. As no additional touch sense electrode and touch drive electrode are required, the display device provided by the embodiment of the invention is lighter and thinner with a more reliable control. Moreover, in the present invention the touch drive electrode or touch sense electrode is connected through a single signal line, which may reduce the signal delay and increase the signal transmission speed.

What are described above is related to the illustrative embodiments of the disclosure only and not limitative to the scope of the disclosure; the scopes of the disclosure are defined by the accompanying claims.

What is claimed is:

1. A capacitive in-cell touch panel comprising an array substrate on which a gate line, a data line and a common electrode layer are disposed, wherein, the common electrode layer comprises a plurality of touch drive electrode elements and a plurality of touch sense electrode elements insulated from each other;

the touch drive electrode elements comprise a plurality of touch drive sub-electrodes, the touch sense electrode elements comprise a plurality of touch sense sub-electrodes;

wherein the touch drive sub-electrodes or the touch sense sub-electrodes are bridged to each other along a data line direction, and the touch sense sub-electrodes or the touch drive sub-electrodes are directly connected with each other along a gate line direction; or, the touch drive sub-electrodes or the touch sense sub-electrodes are bridged to each other along the gate line direction, and the touch sense sub-electrodes or the touch drive sub-electrodes are directly connected along the data line direction;

wherein at least one gate line functions as a touch scan line during a touch period for applying a touch scan signal to the touch drive electrode elements, when the touch drive sub-electrodes are directly connected with each other along the gate line direction and the touch sense sub-electrodes are bridged to each other along the data line direction.

2. The touch panel of claim 1, wherein the touch panel further comprises a signal connection line, when the touch drive sub-electrodes are directly connected with each other along the gate line direction and the touch sense sub-electrodes are bridged to each other along the data line direction, adjacent touch sense sub-electrodes along the data line direction are bridged to each other via the signal connection line, and the signal connection line is disposed in the same direction as the data line.

3. The touch panel of claim 2, wherein the signal connection line and the data line are disposed in the same layer.

4. The touch panel of claim 1, wherein the touch panel further comprises a signal connection line, when the touch drive sub-electrodes are bridged to each other along the data line direction and the touch sense sub-electrodes are directly connected with each other along the gate line direction, adjacent touch drive sub-electrodes along the data line direction are bridged to each other via the signal connection line, and the signal connection line is disposed in the same direction as the data line.

5. The touch panel of claim 4, wherein the signal connection line and the data line are disposed in the same layer.

6. The touch panel of claim 1, wherein the touch panel further comprises a signal connection line, when the touch drive sub-electrodes are directly connected with each other along the data line direction and the touch sense sub-electrodes are bridged to each other along the gate line direction, adjacent touch sense sub-electrodes along the row direction are bridged to each other via the signal connection line, and the signal connection line is disposed in the same direction as the gate line.

7. The touch panel of claim 6, wherein the signal connection line and the gate line are disposed in the same layer.

8. The touch panel of claim 1, wherein the touch panel further comprises a signal connection line, when the touch drive sub-electrodes are bridged to each other along the gate line direction and the touch sense sub-electrodes are directly connected with each other along the data line direction, adjacent touch drive sub-electrodes along the gate line direction are bridged to each other via the signal connection line, and the signal connection line is disposed in the same direction as the gate line.

9. The touch panel of claim 8, wherein the signal connection line and the gate line are disposed in the same layer.

10. A display device comprising the touch panel of claim 1.

11. The display device of claim 10, wherein a signal connection line is disposed in a region corresponding to blue pixels when the signal connection line and the data line in the touch panel are disposed in the same direction.

* * * * *